(12) United States Patent
Guerin et al.

(10) Patent No.: US 10,618,015 B2
(45) Date of Patent: Apr. 14, 2020

(54) PROCESS AND DEVICE FOR MANUFACTURING A LAMINATED MATERIAL COMPRISING A FIBRILLATED CELLULOSE LAYER

(71) Applicants: CENTRE TECHNIQUE DU PAPIER, Gieres (FR); CENTRE NATIONAL DE LA RECHERCHE SCIENTIFIQUE (CNRS), Paris (FR)

(72) Inventors: David Guerin, Chamaliere (FR); Yahia Rharbi, Fontaine (FR); Patrick Huber, Le Cheylas (FR); Valérie Meyer, Saint Martin D'heres (FR)

(73) Assignees: CENTRE TECHNIQUE DU PAPIER, Gieres (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 110 days.

(21) Appl. No.: 15/570,090

(22) PCT Filed: Apr. 27, 2016

(86) PCT No.: PCT/FR2016/050986
§ 371 (c)(1),
(2) Date: Oct. 27, 2017

(87) PCT Pub. No.: WO2016/174348
PCT Pub. Date: Nov. 3, 2016

(65) Prior Publication Data
US 2018/0141009 A1 May 24, 2018

(30) Foreign Application Priority Data
Apr. 28, 2015 (FR) ...................................... 15 53818

(51) Int. Cl.
*B01D 71/10* (2006.01)
*B01D 67/00* (2006.01)
(Continued)

(52) U.S. Cl.
CPC ......... *B01D 71/10* (2013.01); *B01D 67/0004* (2013.01); *B01D 67/0095* (2013.01);
(Continued)

(58) Field of Classification Search
CPC ........ D21H 11/18; D21H 27/30; D21H 27/38; B32B 2317/12; B32B 2317/18;
(Continued)

(56) References Cited

U.S. PATENT DOCUMENTS 6,159,341 A * 12/2000 Egelhof .................... D21F 1/48
162/132
8,752,776 B2 * 6/2014 Dean ........................ D21B 1/12
241/21

(Continued)

FOREIGN PATENT DOCUMENTS

CN 104321131 A * 1/2015 ............. B01D 39/18
EP 0457474 A2 * 11/1991 ............... H04R 7/12
(Continued)

OTHER PUBLICATIONS

Darque-Ceretti et al., "Adhésion et adhérence, Sciences et techniques de l'ingénieur," CNRS Editions, Chapitre 2.3.2.1: Décomposition du travail d'adhésion, ISBN 2-271-06092-3, 2003, pp. 97-99.
(Continued)

*Primary Examiner* — Jose A Fortuna
(74) *Attorney, Agent, or Firm* — Birch, Stewart, Kolasch & Birch, LLP

(57) ABSTRACT

The invention relates to a process for manufacturing a laminated material (S) comprising a fibrillated cellulose layer, characterized in that it comprises the following steps:
(Continued)

(a) depositing a suspension (1) of fibrillated cellulose on a filtration membrane (2) and draining the suspension through that membrane so as to form a wet layer of fibrillated cellulose (A) having a dryness, that is to say a ratio between the mass of dry matter and the total mass of the fibrillated cellulose layer, of between 5% and 18%; (b) transferring the wet layer (A) under pressure to an at least partially hydrophilic surface of a substrate (B), so as to form the laminated material (S); (c) drying the laminated material. The invention also relates to a device for implementing the process.

10 Claims, 2 Drawing Sheets

(51) Int. Cl.
| | | |
|---|---|---|
| *D21F 11/04* | (2006.01) | |
| *D21H 27/30* | (2006.01) | |
| *D21H 11/18* | (2006.01) | |
| *B32B 37/18* | (2006.01) | |
| *B32B 37/20* | (2006.01) | |
| *B32B 29/08* | (2006.01) | |
| *B32B 37/22* | (2006.01) | |
| *D21F 5/04* | (2006.01) | |
| *D21F 9/02* | (2006.01) | |
| *F26B 13/08* | (2006.01) | |
| *D21F 9/00* | (2006.01) | |
| *B32B 38/16* | (2006.01) | |
| *B32B 38/00* | (2006.01) | |

(52) U.S. Cl.
CPC .............. *B32B 29/08* (2013.01); *B32B 37/18* (2013.01); *B32B 37/20* (2013.01); *D21F 5/042* (2013.01); *D21F 9/00* (2013.01); *D21F 9/02* (2013.01); *D21F 11/04* (2013.01); *D21H 11/18* (2013.01); *D21H 27/30* (2013.01); *F26B 13/08* (2013.01); *B32B 37/22* (2013.01); *B32B 38/164* (2013.01); *B32B 2038/166* (2013.01); *B32B 2309/105* (2013.01); *B32B 2317/12* (2013.01); *B32B 2317/18* (2013.01)

(58) Field of Classification Search
CPC .............. B32B 29/08; B32B 2038/166; B32B 2309/105; B32B 37/22; B32B 38/164; B32B 27/10; B01D 67/0004; B01D 67/0095; B01D 71/10; D21F 11/04
See application file for complete search history.

(56) References Cited

U.S. PATENT DOCUMENTS

| | | | | |
|---|---|---|---|---|
| 10,093,066 | B2* | 10/2018 | Lim | B32B 5/022 |
| 2002/0029860 | A1* | 3/2002 | Hamar | D21F 11/04 |
| | | | | 162/123 |
| 2002/0162636 | A1* | 11/2002 | Halmschlager | D21F 9/006 |
| | | | | 162/123 |
| 2003/0116292 | A1* | 6/2003 | Hollmark | D21F 9/006 |
| | | | | 162/132 |
| 2006/0042767 | A1* | 3/2006 | Bhat | B32B 29/00 |
| | | | | 162/117 |
| 2010/0173146 | A1* | 7/2010 | Ihara | B01F 5/0663 |
| | | | | 428/323 |
| 2010/0272938 | A1* | 10/2010 | Mitchell | D21H 13/40 |
| | | | | 428/36.1 |
| 2012/0094047 | A1* | 4/2012 | Albertson | B32B 27/08 |
| | | | | 428/36.6 |
| 2013/0017349 | A1* | 1/2013 | Heiskanen | C09D 101/02 |
| | | | | 428/36.1 |
| 2013/0338250 | A1* | 12/2013 | Umemoto | D21H 11/20 |
| | | | | 522/18 |
| 2017/0028672 | A1* | 2/2017 | Lim | B32B 5/022 |
| 2017/0346059 | A1* | 11/2017 | Kunnari | H01M 2/1626 |
| 2018/0141009 | A1* | 5/2018 | Guerin | B32B 37/20 |
| 2018/0355557 | A1* | 12/2018 | Heiskanen | C08L 1/02 |
| 2019/0062998 | A1* | 2/2019 | Chen | A23L 3/015 |
| 2019/0091982 | A1* | 3/2019 | Heiskanen | B29C 48/08 |
| 2019/0127920 | A1* | 5/2019 | Svending | D21H 17/28 |

FOREIGN PATENT DOCUMENTS

| | | | | |
|---|---|---|---|---|
| EP | 2532782 A1 | 12/2012 | | |
| FR | 3035611 A1 * | 11/2016 | | D21H 27/30 |
| JP | 2013108185 A * | 6/2013 | | |
| WO | WO 2013/060934 A2 | 5/2013 | | |
| WO | WO 2013/171373 A2 | 11/2013 | | |
| WO | WO 2013/171373 A3 | 11/2013 | | |
| WO | WO-2017144009 A1 * | 8/2017 | | A23L 3/015 |

OTHER PUBLICATIONS

International Search Report and Written Opinion of the International Searching Authority (Forms PCT/ISA/220, PCT/ISA/210 and PCT/ISA/237) issued in International Application No. PCT/FR2016/050986 dated Aug. 2, 2016.
Preliminary French Search Report issued in French Application No. 1553818, dated Mar. 23, 2016.

* cited by examiner

PROCESS AND DEVICE FOR MANUFACTURING A LAMINATED MATERIAL COMPRISING A FIBRILLATED CELLULOSE LAYER

FIELD OF THE INVENTION

The present invention concerns a process for manufacturing a laminated material comprising a layer of fibrillated cellulose, and a device for manufacturing said material.

BACKGROUND OF THE INVENTION

Laminated materials comprising a substrate and a layer of fibrillated cellulose are of particular interest since the layer of fibrillated cellulose imparts barrier properties to the substrate that are useful for packaging in particular.

Four types of processes are known for manufacturing such materials.

In one first process, known as the paper-making route, a very dilute suspension of cellulose (i.e. having a concentration of less than 5% by weight) is deposited on a web and a very dilute suspension of fibrillated cellulose is sprayed thereupon so that, after drainage through said web, a wet laminated fibrous web is obtained having a cellulose concentration in the order of 20% by weight, the layer of fibrillated cellulose having a lower concentration. The use of spraying, having regard to the speed of the machine, does not allow a very thick layer of fibrillated cellulose to be obtained once dried, the thickness generally being less than 3-5 µm.

In a second process used to manufacture cardboard, a very dilute suspension of cellulose is deposited on a web and, on an adjacent web, a very dilute suspension of fibrillated cellulose is deposited; drainage is caused to occur through each of the webs to obtain a fibrous web having a concentration of 10 to 15% by weight of cellulose, and the two webs are then assembled together. This process does not allow a thin layer of fibrillated cellulose to be obtained after drying, the thickness of the layer of fibrillated cellulose generally being greater than 15-20 µm.

The drainage of a suspension of fibrillated cellulose through a web is described in document WO 2013/171373.

In both these processes, the water content of the laminated fibrous web is reduced by means of a press that may be heated. One problem associated with this technique is that the layer of fibrillated cellulose adheres to the press, making handling difficult. Also, dehydration of said wet web is difficult to carry out.

In a third process known as a coating process, a suspension of fibrillated cellulose is coated onto the substrate to form a wet layer that is dried by infrared radiation (gas or electric), by convection (hot air) or conduction (in contact with a drying cylinder). However, for a concentration in the order of 2% by weight of fibrillated cellulose, the suspension has the consistency of a gel that is difficult to spread. To facilitate application of this suspension, the concentration of fibrillated cellulose must be reduced by increasing the amount of water. However, this increase in the water content deteriorates the properties of the fibrous substrate, makes it difficult to dry the layer of fibrillated cellulose and makes it difficult to obtain a sufficient layer thickness for the exhibiting of improved performance.

In a fourth process, a self-supporting film of fibrillated cellulose is produced as described in document WO 2013/060934 and is bonded by lamination onto a previously manufactured dry fibrous support material. This process does not allow narrow thicknesses of the layer of fibrillated cellulose to be obtained (less than 15 µm), since the fragility of thin films of fibrillated cellulose makes handling thereof difficult. Also, this technique requires the use of an adhesive to cause the self-supporting film to adhere to the fibrous support material. The laminated material thus obtained therefore comprises an adhesive layer.

Also, at the current time no process is known allowing a laminated material to be produced comprising a very thin layer of fibrillated cellulose (e.g. in the order of 3 to 20 µm), which in addition is also continuous and homogeneous.

SUMMARY OF THE INVENTION

It is one objective goal of the invention to overcome the above-cited disadvantages and to design a process for manufacturing a laminated material that is simpler to implement and in particular allows a homogeneous layer of fibrillated cellulose to be obtained, deposited in a single operation, that is thicker than with known processes and minimizes drying needs.

According to the invention, there is proposed a process for manufacturing a laminated material comprising a layer of fibrillated cellulose, characterized in that it comprises the following steps:

(a) depositing a suspension of fibrillated cellulose on a filtering membrane and draining said suspension through the membrane to form a wet layer of fibrillated cellulose having a dryness, i.e. ratio between the mass of dry matter and the total mass of the layer of fibrillated cellulose, of between 5 and 18%, (b) transferring said wet layer under pressure onto an at least partly hydrophilic surface of a substrate, to form said laminated material, (c) drying said laminated material.

By "fibrillated cellulose" is meant cellulose refined into at least 50% fibrils of nanometric diameter.

By "at least partly hydrophilic surface" is meant a surface having non-zero non-dispersive interactions of Lewis acid-base type such as defined in the Van Oss-Chaudhury-Good theory described in the work by [Darque-Ceretti and Felder]. In practice, said surface has a contact angle between a water droplet and the substrate of less than 90°, the contact angle being the angle between the tangent to the droplet at the point of contact with the substrate.

According to one embodiment, the concentration of fibrillated cellulose in the suspension used at step (a) is between 0.5 and 2% by weight.

Preferably, the dryness of the wet layer of fibrillated cellulose formed at step (a) is between 7 and 15%.

In particularly advantageous manner, the dryness of the layer of fibrillated cellulose in the laminated material obtained after step (c) is between 80% and 99%.

According to other advantageous characteristics of the invention taken alone or in combination:

the wet layer of fibrillated cellulose obtained after step (a) has a thickness of between 20 µm and 750 µm, the wet layer of fibrillated cellulose after step (b) has a thickness of between 15 µm and 500 µm.

the layer of fibrillated cellulose obtained after step (c) has a thickness of between 3 µm and 100 µm.

According to one embodiment of the invention, the substrate is paper or cardboard.

In particularly advantageous manner, at step (b), the wet layer of fibrillated cellulose adheres to the substrate via direct contact with the at least partly hydrophilic surface of said substrate.

According to one embodiment, the substrate is driven in movement and the wet layer of fibrillated cellulose is continuously transferred onto said substrate.

According to another embodiment, the layer of fibrillated cellulose is discontinuously transferred onto the substrate at step (b).

A further objective of the invention concerns a device for manufacturing a laminated material comprising a layer of fibrillated cellulose. Said device comprises:
- a manufacturing unit to manufacture a wet layer of fibrillated cellulose, comprising a device to deposit a suspension of fibrillated cellulose on a filtering membrane, and means for draining said suspension through the membrane so as to form a wet layer of fibrillated cellulose having dryness of between 5 and 18%,
- a transfer unit to transfer under pressure said wet layer of fibrillated cellulose leaving the manufacturing unit onto a substrate to form a laminated material.
- a drying unit to dry said laminated material leaving the transfer unit.

BRIEF DESCRIPTION OF THE DRAWINGS

Other characteristics and advantages of the invention will become apparent from the following detailed description given with reference to the appended drawings in which.

DETAILED DESCRIPTION OF THE INVENTION

Figure 1:
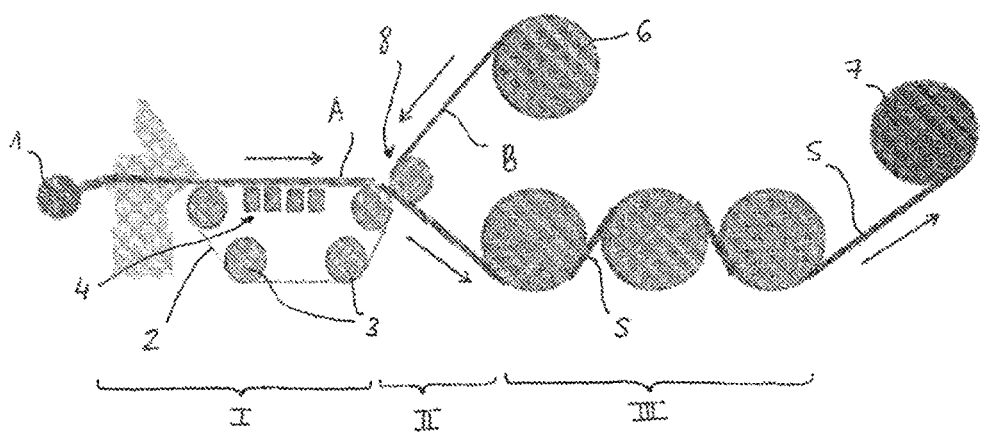
FIG. 1 is a schematic view of an installation allowing implementation of one embodiment of the process for manufacturing laminated material, wherein the wet layer of fibrillated cellulose is entirely transferred onto a travelling substrate.

Fibrillated cellulose is a heterogeneous nanomaterial composed of elements of micrometric size (fibre fragments) and of at least 50% by number of nano-objects (i.e. objects having at least one dimension of between 1 and 100 nanometres). These cellulose nano-objects are called "microfibrils" or MFC (Micro Fibrillated Cellulose), "nano-fibrils" or NFC (Nano Fibrillated Cellulose), and CNF (Cellulose Nanofiber). Cellulose micro- or nano-fibrils typically have a diameter in the order of 20 to 60 nm and length of 0.5 to 5 µm.

The forming of fibrillated cellulose from cellulose fibres is known as such and will therefore not be described in the remainder hereof.

Fibrillated cellulose is typically supplied in the form of an aqueous suspension. Optionally, additives can be incorporated in the suspension e.g. binders, dispersants, mineral particles, metal oxides, plasticizers and rheological agents resistant in the dry or wet state, cross-linkers, antimicrobial agents, cellulose or synthetic fibres or silver nanowires or other molecules which, after processing, are trapped in the layer of fibrillated cellulose.

The concentration of fibrillated cellulose in the suspension is typically between 0.1% and 4% by weight. Preferably, said concentration is between 0.6% and 2% by weight.

At a first step of the process, the suspension is deposited in the form of a layer on a filtering membrane. This membrane has an open meshwork that is sufficiently large to promote removal of water via filtration whilst being sufficiently small to promote retaining of the fibrillated cellulose on the membrane. A woven fabric with small aperture (mesh opening 0 µm, free surface <10%), frequently used in the area of filtration is suitable for this use. Solely by way of indication, a fabric marketed under the reference SEFAR™ PETEX™ 07-1/2 is suitable for this use. The membrane may also be a synthetic membrane.

Filtration through the membrane is frontal, allowing draining of part of the water and consequently some dehydration of the layer of fibrillated cellulose. This draining step is continued until dryness of the layer of fibrillated cellulose reaches between 5 and 18%, preferably between 7 and 15% by weight. Dryness, which corresponds to the ratio between the mass of dry matter and the total mass of the layer of fibrillated cellulose (i.e. the sum of the masses of dry matter and of the water contained in the layer), can be measured conventionally using a drying oven or thermobalance.

Within said range of dryness, the layer of fibrillated cellulose has sufficient cohesion for handling thereof. Also, as will be seen below, this dryness range provides the layer with advantageous properties of adhesion onto a surface that is at least partly hydrophilic.

After this step, the thickness of the wet layer of fibrillated cellulose is advantageously between 20 and 750 µm, preferably between 30 and 200 µm.

The wet layer of fibrillated cellulose is then transferred onto an at least partly hydrophilic surface of a substrate having dryness higher than 60%, preferably higher than 85% (said substrate then being considered to be «dry») and pressure is applied to promote close contact between the wet layer of fibrillated cellulose and the substrate.

Under the above-mentioned dryness conditions, the wet layer of fibrillated cellulose behaves as a gel which, by means of its water-retaining properties, prevents excessive wetting of the substrate.

According to one embodiment, the process for manufacturing laminated material is continuous, the substrate being in the form of a moving flexible strip.

According to another embodiment, the manufacturing process is discontinuous, the wet layer being sequentially transferred onto the substrate or onto separate pieces.

Transfer is advantageously performed under conditions allowing close, direct contact between the substrate and the layer of fibrillated cellulose i.e. in particular: at a temperature of between 20° C. and 140° C., for a time of up to 15 s, usually between 10 ms and 1 s; at a pressure of between 0.1 and 40 MPa.

The inventors have discovered that with the above-mentioned dryness range (5-18%, preferably 7-15%), the wet layer of fibrillated cellulose adheres to the substrate via direct contact with the at least partly hydrophilic surface. No intermediate adhesive material is therefore needed to ensure this adhesion.

Transfer is followed by drying of the laminated material, and leads to a final dryness of the layer of fibrillated cellulose of between 80 and 99%, preferably between 88 and 95%. Drying can be carried out using any suitable means, particularly including convection drying means (heated roller for example), radiation (e.g. infrared lamp), microwave or convection.

FIG. 1 illustrates one embodiment of an installation allowing implementation of the above-described process.

This installation comprises three main parts:
- part I comprises a system to form the wet layer of fibrillated cellulose;
- part II comprises a system to transfer the wet layer onto the dry substrate;
- part III comprises a system to dry the laminated material formed in part II.

The arrows indicate the direction of travel of the wet layer of fibrillated cellulose, the paper and the laminated material.

Part I comprises a system to deposit a suspension of fibrillated cellulose 1 on a filtering membrane 2. The filtering membrane may be in the form of a continuous strip driven by rollers 3 above suction members 4 which promote drainage through the filtering membrane. Part I allows the formation of a wet layer of fibrillated cellulose A.

In the embodiment illustrated FIG. 1, the substrate B is in the form of a reel of paper. A strip of paper B is driven between a dispensing spool 6 and winding spool 7.

Part I and Part II are positioned side by side so that when the wet layer A has the required dryness (between 5 and 18%), said layer A is able to be applied onto the paper B through a roller 8.

If the substrate does not have the same properties on each of its sides, provision is made so that it is a surface that is at least partly hydrophilic of paper B that is placed in contact with the wet layer A. Therefore, via direct contact between the wet layer A and said at least partly hydrophilic surface, good adhesion is obtained of the wet layer on the substrate.

In part III, the laminated material S formed of layer A and substrate B is conveyed in an atmosphere at high temperature for drying of the wet layer. The means used in part III are means conventionally used for a paper drying section or dryer positioned at the exit of a coating machine, and are therefore not described in detail herein.

On leaving part III, the laminated material is wound by the winding spool 7 to form a reel.

Of course, FIG. 1 is given for illustration purposes only and is nonlimiting. In particular, the manufacturing of the laminated material can be carried out using means other than those schematized in FIG. 1, without departing from the scope of the present invention.

Figure 2:
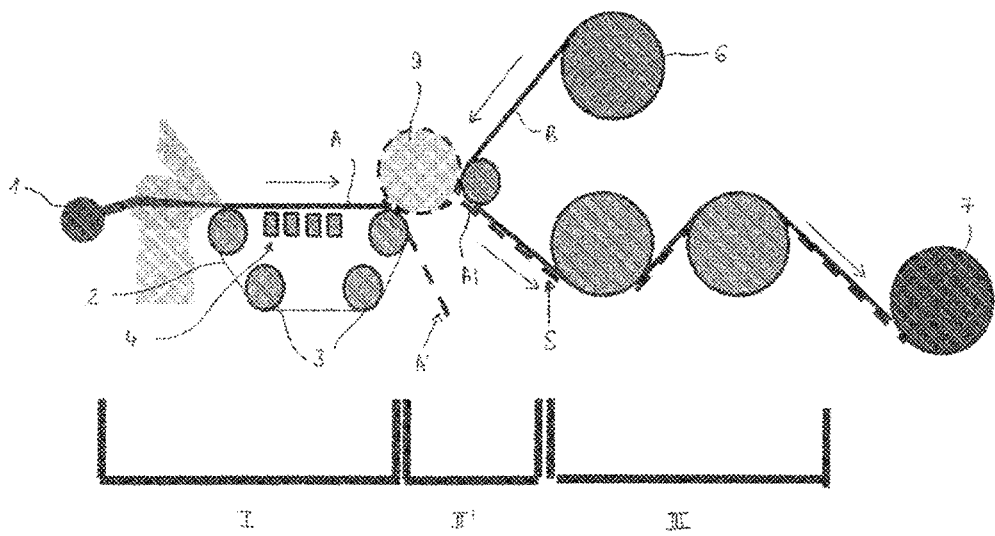
FIG. 2 is a schematic view of an installation for manufacturing a laminated material according to another embodiment, wherein the wet layer of fibrillated cellulose is locally transferred onto a travelling substrate.

FIG. 2 illustrates an installation allowing the implementation of another embodiment for manufacturing a laminated material of the invention.

Parts I and III are similar to those in FIG. 1 and will therefore not be further described.

As in FIG. 1, the substrate B is in the form of a paper reel. A strip of paper B is conveyed between a dispensing spool 6 and winding spool 7.

Part II' comprises means for cutting portions $A_i$ of the wet layer of fibrillated cellulose. Each of said portions $A_i$ is transferred under pressure e.g. by means of a roller 9 onto the travelling strip of paper B. The scraps A' resulting from this cutting are advantageously recovered for recycling.

A strip of paper is thereby formed, wherein only those regions onto which the portions $A_i$ of fibrillated cellulose have been transferred are laminated.

Figure 3:
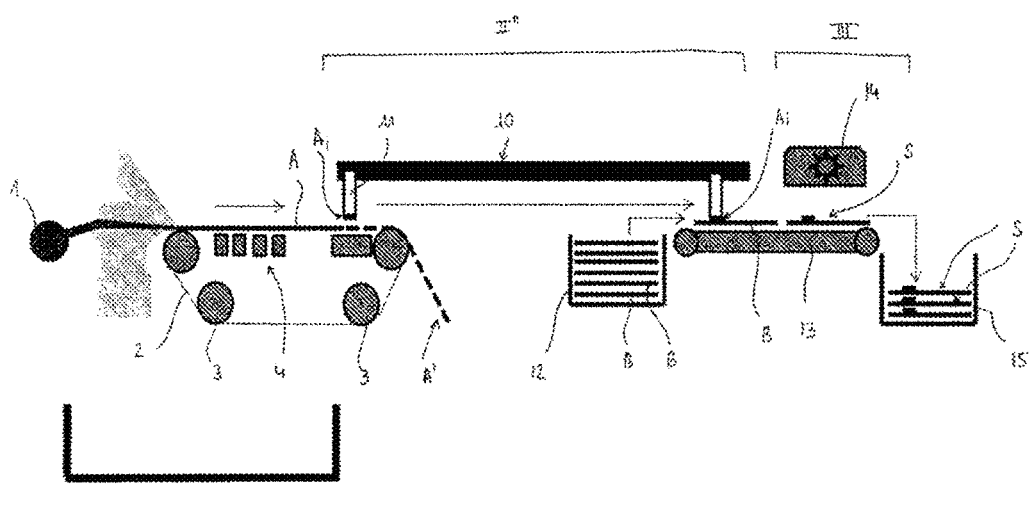
FIG. 3 is a schematic view of an installation for manufacturing a fibrillated material according to another embodiment, wherein the wet layer of fibrillated cellulose is cut to obtain layer portions that are successively transferred onto a plurality of separate substrates.

FIG. 3 illustrates an installation allowing the implementation of another mode for manufacturing a laminated material of the invention, wherein the substrate is no longer a moving strip of paper but a plurality of unit pieces.

Part I is similar to the one in FIG. 1 and is therefore not further described.

The substrates B are supplied in a container 12 from which they are successively collected for the manufacturing of a respective laminated material.

The installation comprises a device II" to cut and transfer a portion of layer of fibrillated cellulose. This device comprises cutting means 11 e.g. a punch which successively punches a plurality of portions $A_i$ in layer A and transfers said portions $A_i$, by means of a positioning system 10, to above a belt 13 on which substrates B are conveyed. When portion $A_i$ is positioned on substrate B, pressure is applied by means 11 to promote adhesion.

Portion $A_i$ may cover the entire surface of substrate B or, as schematized in FIG. 3, it may cover only part of the surface of substrate B. In this latter case, there is localised presence of the laminated material S on the surface of substrate B.

Although illustrated in FIG. 3 as being planar, substrate B may have any other shape. For example, in the packaging sector, substrate B may be a cardboard tray. In this case, the transfer of the portion of wet layer of fibrillated cellulose is advantageously carried out using a counter-mould mating with that of the substrate.

The installation also comprises a system III to dry the laminated material. This system, facing the belt 13, comprises a dryer 14 below which the laminated materials are conveyed.

On leaving the dryer, the laminated materials S are placed in a container 15 for transport and/or storage.

The laminated material obtained can give rise to multiple applications.

The substrate can be any material in the paper family, including paper and paperboard for printing-writing, paper and cardboard for packaging, paper for sanitary and domestic use, specialty papers and cardboards, nonwovens, etc.

The substrate may be composed of a single layer or of a stack of several layers.

The layer of fibrillated cellulose imparts improved surface properties to the laminated material which can be used to advantage in particular in packaging applications (to impart gas or liquid barrier properties for example), in printing/write applications (to immobilise inks or varnishes on the surface and limit penetration thereof into the fibrous network of the substrate), or in specialty applications. The laminated material can therefore be used in the building sector, energy sector or in the field of electronics.

Also, the formed complex improves the mechanical properties of the substrate due to the layer of fibrillated cellulose (in particular in terms of rigidity, tensile strength) and therefore advantageously finds application in all kinds of paper.

Finally, the above-cited examples are evidently only particular illustrations and are in no way limiting with respect to the fields of application of the invention.

REFERENCES

WO 2013/171373
WO 2013/060934
[Darque-Ceretti & Felder]: Adhesion et adherence, Evelyne Darque-Ceretti, Eric Felder, Sciences et techniques de l'ingenieur, CNRS Editions, ISBN 2-271-06092-3, 2003, Chapitre 2.3.2.1 Décomposition du travail d'adhésion, pp. 97-99.

The invention claimed is:
1. A process for manufacturing a laminated material comprising a layer of fibrillated cellulose, comprising the following steps:

(a) depositing a suspension of fibrillated cellulose on a filtering membrane and draining said suspension through the membrane to form a wet layer of fibrillated cellulose having dryness which corresponds to the ratio between the mass of dry matter and the total mass of the layer of fibrillated cellulose, of between 5 and 18%, (b) transferring said wet layer under pressure onto an at least partly hydrophilic surface of a substrate, to form said laminated material, wherein the wet layer of fibrillated cellulose adheres to the substrate via direct contact with the hydrophilic surface of said substrate, (c) drying said laminated material.

2. The process according to claim 1, wherein the concentration of fibrillated cellulose in the suspension is between 0.5 and 2% by weight.

3. The process according to claim 1, wherein the dryness of the wet layer of fibrillated cellulose formed at step (a) is between 7 and 15%.

4. The process according to claim 1, wherein the dryness of the layer of fibrillated cellulose in the laminated material obtained after step (c) is between 80% and 99%.

5. The process according to claim 1, wherein the wet layer of fibrillated cellulose obtained after step (a) has a thickness of between 20 µm and 750 µm.

6. The process according to claim 1, wherein the wet layer of fibrillated cellulose obtained after step (b) has a thickness of between 15 µm and 500 µm.

7. The process according to claim 1, wherein the layer of fibrillated cellulose obtained after step (c) has a thickness of between 3 µm and 100 µm.

8. The process according to claim 1, wherein the substrate is paper or cardboard.

9. The process according to claim 1, wherein the substrate is driven in movement and the wet layer of fibrillated cellulose is continuously transferred onto said substrate continuously.

10. The process according to claim 1, wherein the layer of fibrillated cellulose is discontinuously transferred onto the substrate at step (b).

* * * * *